May 19, 1970   W. W. LOOSE   3,513,299
CREDIT CARD READER

Filed March 19, 1965   6 Sheets-Sheet 1

INVENTOR.
WINFIELD WARREN LOOSE
BY Curtis, Morris & Safford

May 19, 1970

W. W. LOOSE 3,513,299

CREDIT CARD READER

Filed March 19, 1965

INVENTOR.
WINFIELD WARREN LOOSE
BY Curtis, Morris & Safford

INVENTOR.
WINFIELD WARREN LOOSE
BY Curtis, Morris & Safford

INVENTOR.
WINFIELD WARREN LOOSE
BY Curtis, Morris & Safford

United States Patent Office 3,513,299
Patented May 19, 1970

3,513,299
CREDIT CARD READER
Winfield Warren Loose, Reading, Pa., assignor to
AMP Incorporated, Harrisburg, Pa.
Filed Mar. 19, 1965, Ser. No. 441,179
Int. Cl. G06k 7/06; H01h 43/08; H05b 39/00
U.S. Cl. 235—61.11                                    11 Claims

ABSTRACT OF THE DISCLOSURE

A card reader comprises stationary and movable contact means between which is provided a card-receiving area in which a data card is to be disposed. The movable contact means is provided with contact members disposed between an insulating block with the contact members defining plate means having leg members extending outwardly at an acute angle with respect to the plate means and contact feet at the free ends of the leg members. The contact feet are disposed in alignment with respective contact elements on the stationary contact means. Operating means is connected to the movable contact means to move the movable contact means towards the stationary contact means with the edges of the contact feet wipingly engaging respective contact elements of the stationary contact means and the contact feet and leg members are movable in the same containing the plate means.

---

This invention relates to a card reader and more particularly to an manualy operated card reader of the type to read information on cards of the credit card variety.

Credit cards or small cards having coded information thereon are being used in an ever increasing number in today's business or other areas. A few of the fields in which these cards are utilizable are: accounting, identification, account identification, credit capability, process control, etc. It is therefore a primary object of the present invention to provide a manually operated card reader to read out the coded information on a credit card or the like in a reliable and effective manner.

Another object of the invention is to provide a card reader having a removable contact block which contains movable contact members.

A further object of the invention is the provision of double spring contacts that are guided in a movable contact block.

An additional object of the invention is to provide spring contacts that are stamped out in final form.

It is another object of the invention to provide a card reader wherein the card to be read is placed in an operative position in a card reading position without the use of any movable parts.

It is a further object of the invention to provide a card reader wherein each contact means undergoes a double wiping action at its sensing position.

It is an additional object of the invention to provide a card reader wherein a card is readily ejected after the information thereon has been read out.

Still another object of the invention is to provide a card reader that is readily utilizable in conjunction with existing equipment.

Still a further object of the invention is the provision of a novel electrical switch means wherein movable contact members engage corresponding stationary contact members and the movable contact members double wipe the stationary contact members during pressurized engagement therebetween.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a card reader construction having a stationary portion including spaced contact members in the form of rails which are in alignment with an entrance through which a card is to be inserted. A carriage is movably mounted relative to the portion carrying the rails. Movable contact members are carried by the carriage in corresponding relationship with respect to the rails and the movable contact members are guided in their movement when engaging respective rails. The carriage is guided in its movement relative to the portion carrying the rails and guide and operating means are associated with the carriage to cause the movable contact members to wipingly engage the rails while under the influence of pressure. Ejection means is provided in the card reader in order to readily eject the card therefrom after the coded information thereon has been read out therefrom.

In the drawings:

FIGS. 5 and 6 are partial sectional views showing the positions of the contact members in their normally inoperative and operative positions, respectively; FIG. 6 being taken along lines 6—6 of FIG. 7;

Figure 1:
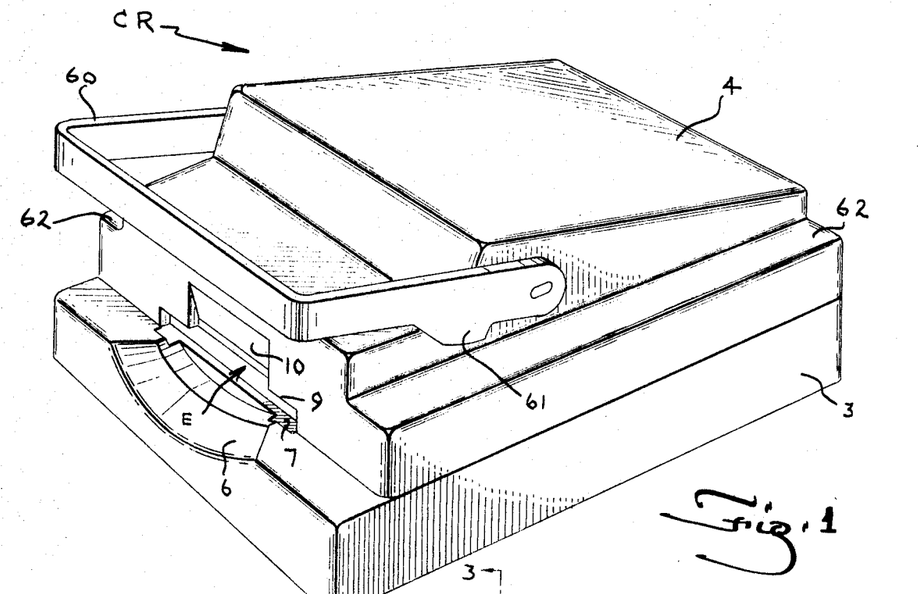
FIG. 1 is a perspective view of the card reader; in an operative position but without a card therein.

Turning now to the drawings, FIG. 1 illustrates a card reader CR in its complete and finished condition for use to receive in an entrance E a credit card 1 (FIGS. 4, 6, 7, 8b, 15 and 16) therein in order to read out the coded information of the credit card which is in the form of a code identified as openings or perforations 2 in the card. Entrance E is formed between base 3 and a cover member 4 of the card reader. Base 3 is a box-shaped member having a partially open bottom 5 (FIGS. 3, 8a and 8b) and a frusto-conical recess 6 (FIGS. 1, 2, 8a and 8b) in the front wall defining part of entrance E. Recess 6 is in communication with a recessed area 7 (FIGS. 1, 2, 8a and 8b) in the center part of the front wall of base 3. An outer end of card 1 is pressed against recessed area 7 when the card is in position within the card reader, and this recessed area maintains the credit card in position therein as illustrated in FIG. 8b.

A plate 8 (FIGS. 3, 8a and 8b) is removably attached to the undersurface of bottom 5 in order to provide protection to the mechanism within the card reader. A recessed section 9 (FIG. 1) is disposed in the front surface of cover member 4 opposite recessed area 7 in order to define the other half of entrance E. An inwardly inclined section 10 is also disposed in the front surface of cover member 4 and it is in communication with recessed section 9. Both frusto-conical recess 6 and inwardly inclined section 10 allow an operator to readily place a card 1 within the operating area of the card reader in order that it can properly be positioned therewithin as illustrated in FIG. 8b. Recess 6 allows the card to be readily grasped after it has been ejected from the operating position which will be discussed in greater detail hereinafter. Of course, cover member 4 is removably secured to base 3.

A mounting base 11 (FIGS. 2–4, 8a, 8b and 15) is secured to bottom 5 by screw members 12. Mounting plates 13 are secured to each side of mounting base 11 via screw members 14 at the front ends thereof and by pins 15 about midway thereof. Part of each pin 15 extends outwardly from its corresponding mounting plate 13. A rectangular opening 16 extends through each mounting plate 13.

An insulating plate 17 is secured on top of base 11 and conductive rails 18 are mounted in parallel slots 19 disposed in plate 17. Each rail member has an omega-shaped configuration in cross section as illustrated in FIGS. 5 and 6 including legs 20 which engage one side of plate 17 and lugs 21 which are struck out at intervals along the length of the rail member which resiliently engage the other surface of plate 17 in order to secure the rail member in position thereon.

Figure 5:
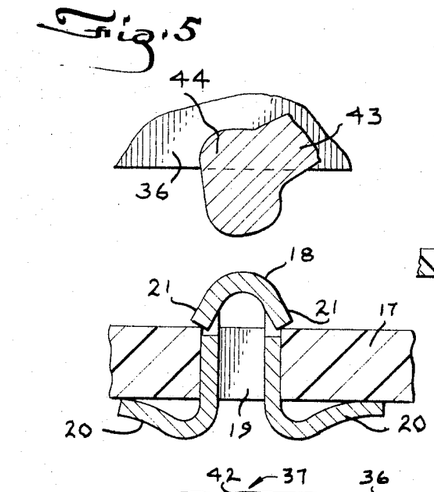
Figure 6:
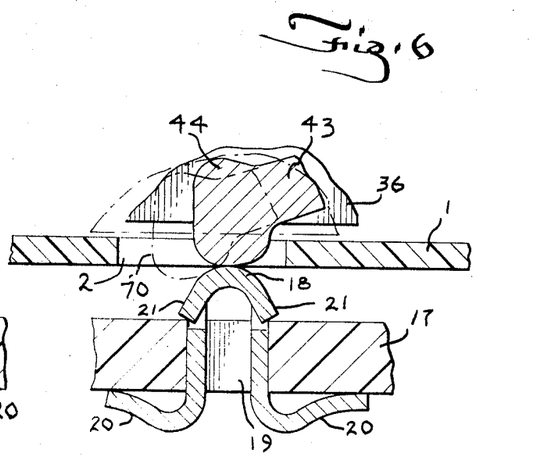

In assembly, rail members 18 are inserted within respective slots 19 of plate 17 so that during the insertion of the rail members within their slots, lugs 21 are cammed inwardly; and, as soon as the lugs reach the other surface of plate 17, they spring outwardly and engage the edges of slots 19 as illustrated in FIGS. 5 and 6. Thus, legs 20 and lugs 21 secure rail members 18 within respective slots 19 of plate 17 and legs 20 are shaped so as to provide constant pressure on lugs 21. Of course, lugs 21 can be moved inwardly in order to remove the rail members from their respective slots. Each rail member 18 presents an arcuate-shaped stationary contact member extending above the upper surface of insulating plate 17.

Figure 8A:
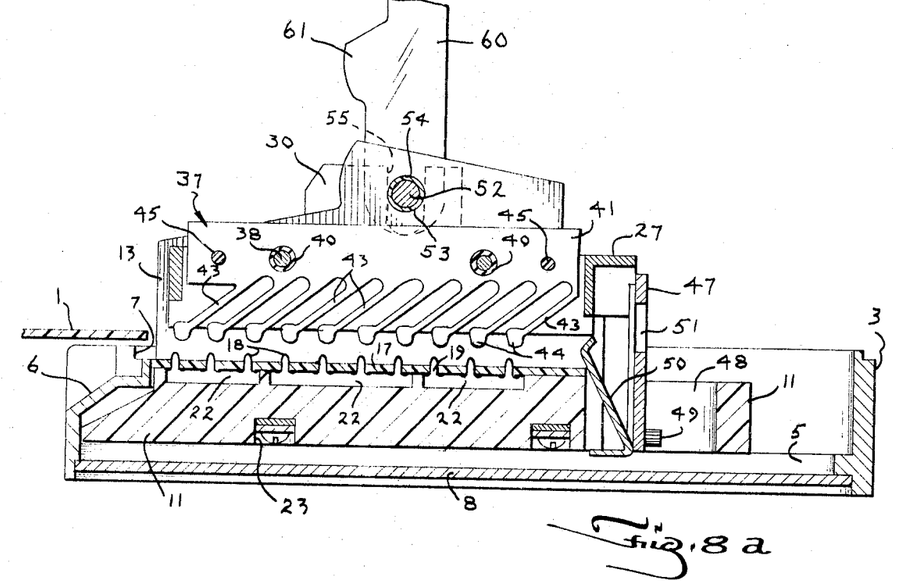
FIGS. 8a and 8b are views taken along lines 8—8 of FIG. 2 with FIG. 8a showing the card reader in its normally inoperative position prior to the insertion of a card within its card-receiving area and FIG. 8b showing the card reader in its operative position reading out information from a card located within its card-receiving area.

As illustrated in FIGS. 8a and 8b, rail members 18 are disposed over cavities 22 disposed in the upper surface of base 11 in order to provide room for legs 20. Cavities 22 are in communication with openings (not shown) in base 11 so that rail members 18 can be connected to appropriate conductive means (not shown). If desired, mounting base 11 and insulating plate 17 can be an integral member and rail members 18 or other similar conductive members can be disposed therewithin. Also, rail members 18 and plate 17 may take the form of a printed circuit board or the like.

Figures 3, 4:
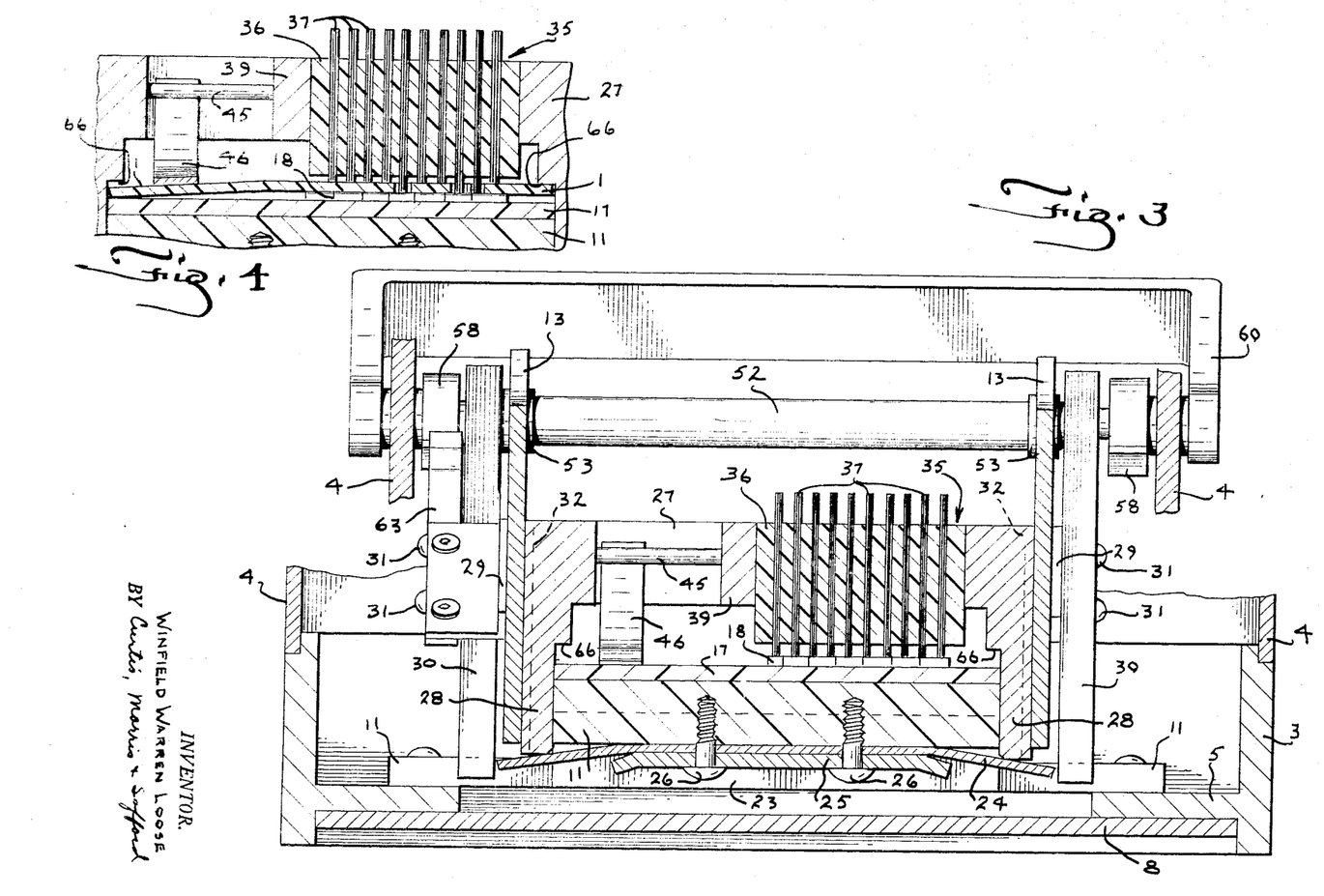
FIG. 3 is a view taken along lines 3—3 of FIG. 2.
FIG. 4 is a partial view of FIG. 3 showing a card in position relative to the contact members.

Transverse channels 23 are disposed in the bottom surface of base 11 and the linear spring member 24 is disposed in each channel 23 with a plate 25 and screws 26 securing the spring member therewithin as illustrated in FIGS. 3, 8a and 8b.

Figure 8B:
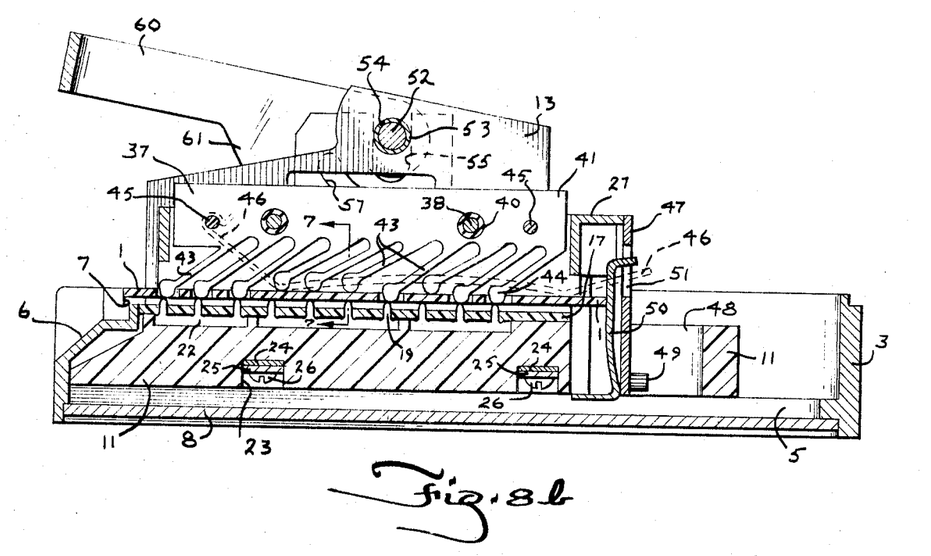
Figure 9:
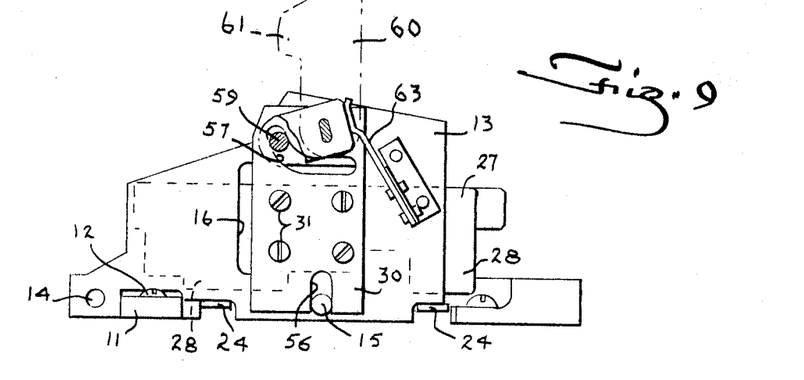
FIGS. 9 and 10 are similar to FIGS. 8a and 8b except that part of the mechanism to guide and operate the movable carriage carrying the movable contact members is illustrated.
Figures 15, 16:
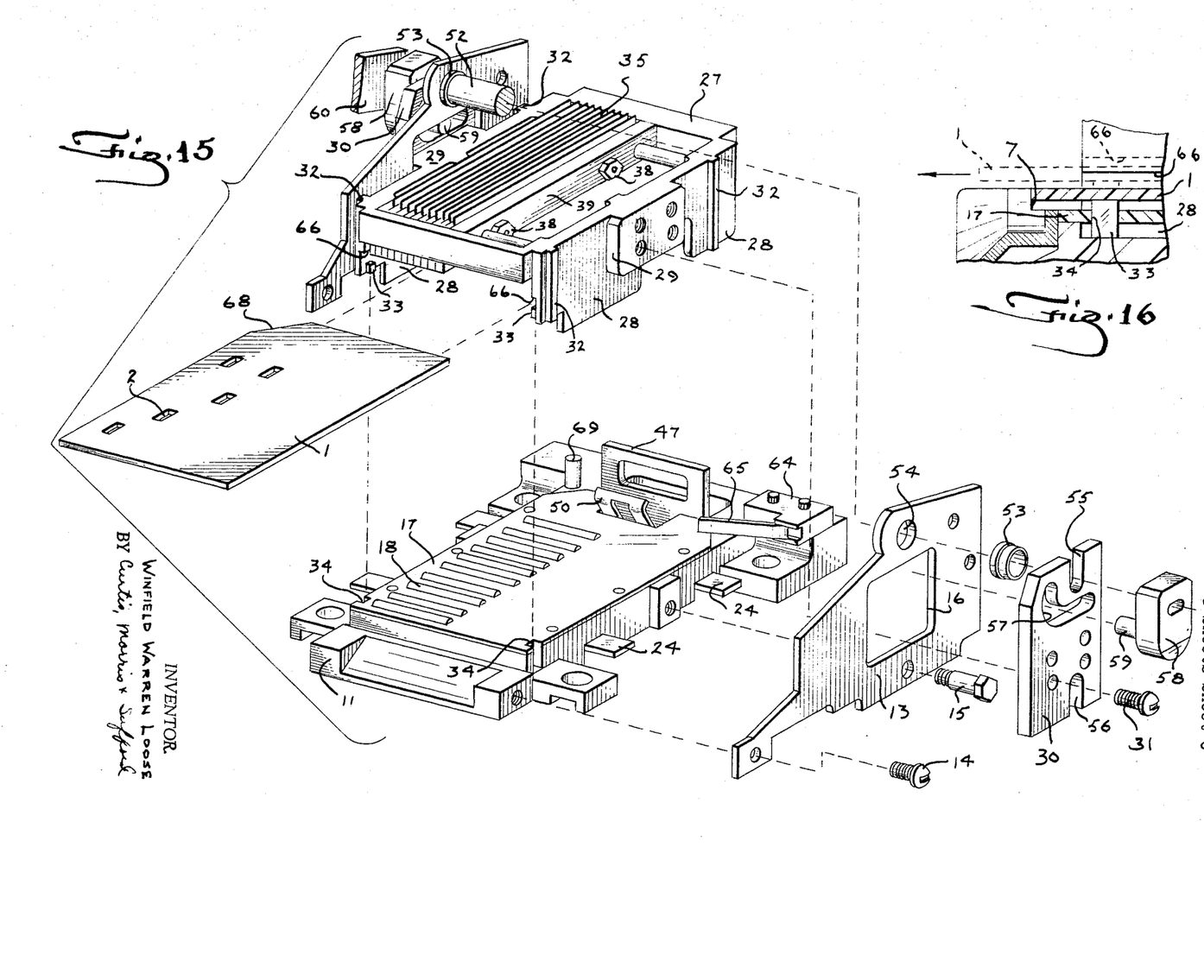
FIG. 15 is an exploded perspective view of the operating mechanism of the card reader.
FIG. 16 is a partial sectional view showing the operation of the ejection means.

Carriage 27 is movably mounted between mounting plates 13 and mounting base 11. Legs 28 extend outwardly from carriage 27 and they are in engagement with spring members 24 (FIG. 3) which maintain the carriage in a normally inoperative position as illustrated in FIGS. 8a and 9. An extension 29 extends outwardly from each side of carriage 27 and through a respective opening 16 in each mounting plate 13 as illustrated in FIGS. 3 and 15. Each extension 29 is secured to a guide and operating member 30 by screw means 31. Projections 32 extend outwardly from each side of carriage 27 forwardly of and rearwardly of extensions 29, and these projections engage mounting plates 13 in order to maintain carriage 27 in parallel alignment with mounting base 11 during the movement of carriage 27. Lugs 33 (FIGS. 15 and 16) extend inwardly from the front side of carriage 27 and these lugs mate with slots 34 in insulating plate 17; the use for these lugs will be explained in greater detail hereinafter. Contact assembly 35 is mounted on carriage 27 and includes insulated blocks 36 (FIGS. 3, 4 and 7) separating the contact members 37. Bolts 38 extend from one side of carriage 27 through contact assembly 35 to a plate 39 in order to secure the contact assembly in carriage 27 as illustrated in FIGS. 2, 8a, 8b and 15. Insulation 40 is disposed in contact members 37 surrounding bolts 38 in order to insulate the contact members therefrom. Of course, bolts 38 may be made of plastic material.

Figure 7:
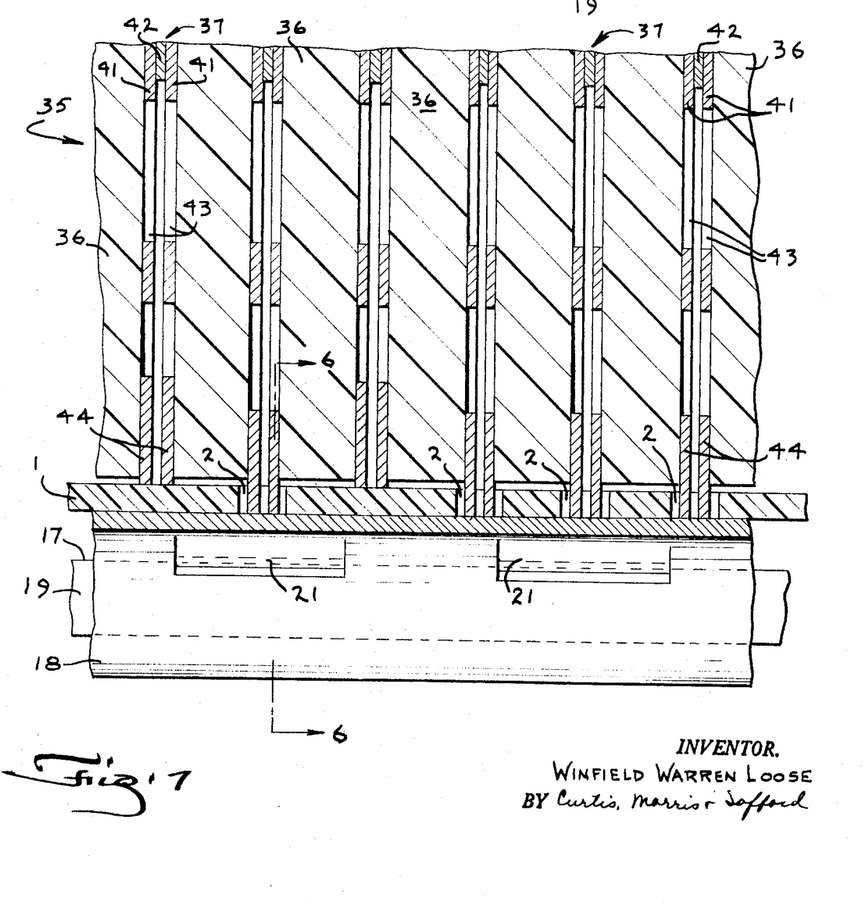
FIG. 7 is a view taken along lines 7—7 of FIG. 8b.

Each of contact members 37 comprises contact plates 41 separated by linear plate 42 (see FIG. 7). Each contact plate 41 is formed as a result of a stamping operation from metal having suitable spring characteristics such as, for example, phospho-bronze and includes stiffly-flexible leg members 43 extending outwardly at an angular disposition of about 35° from the main portion of the contact plate as illustrated by FIGS. 8a and 8b, the number of leg members corresponding to that of rail members 18. Each of leg members 43 has a contact foot 44, and, as can clearly be discerned from FIGS. 5 and 6, the outer surface of contact 44 is continuously curved and is smooth.

Each contact member 37 is disposed between insulating blocks 36, and, as clearly illustrated in FIG. 7, a linear plate 42 is disposed between contact plates 41 so that each contact member 37 contains double leg members 43 and contact feet 44 at every position opposite rail members 18. In their normally inoperative position, contact feet 44 are disposed in direct alignment with respective rail members 18 as illustrated in FIG. 5. Since part of contact feet 44 are disposed between insulating blocks 36 and linear plates 42 are disposed between contact plates 41, suitable space is provided between insulating blocks 36 so that leg members 43 are easily moved therein, and contact feet 44 and their respective leg members 43 are guided therein. This space also provides stability for leg members 43 and their contact feet 44 during their movement between spaced blocks 36. The wiping action between contact feet 44 and respective rail members 18 will be discussed in detail hereinafter.

Figure 2:
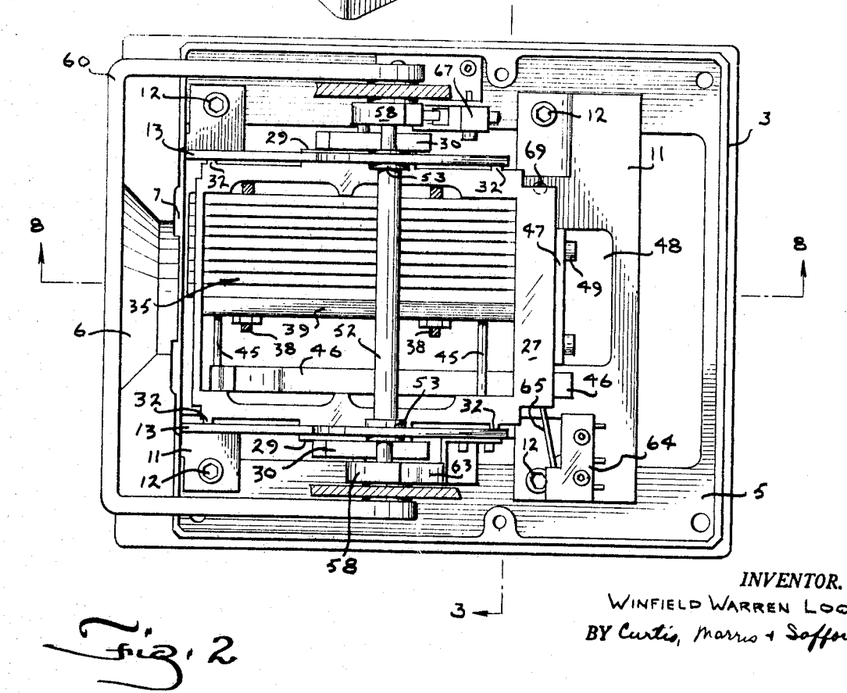
FIG. 2 is a top plan view of the card reader with the cover removed therefrom.

Insulating rods 45 are disposed between the sides of carriage 27 and they extend through contact assembly 35. A drag spring 46 (FIGS 2–4 and 8b) has one end connected to the forward most of the insulating rods 45 while a portion thereof resiliently engages the upper surface of insulated plate 17. The other end of spring 46 extends upwardly in engagement with the bottom of carriage 27 and outwardly therefrom as illustrated in FIG. 2. An index plate 47 is disposed within an opening 48 in mounting base 11 adjacent the inner end of insulating plate 17 as illustrated in FIGS. 2, 8a, 8b and 15. Screws 49 secure index plate 47 and one end of ejection spring 50 on mounting base 11. An opening 51 is disposed in index plate 47 in order to allow the free end of ejection spring 50 to move thereinto as illustrated in FIG. 8b. The operation of springs 46 and 50 will be explained in greater detail hereinafter.

Rod 52 is rotatably mounted in plastic bushings 53 which are disposed in apertures 54 in mounting plates 13 above openings 16 there (see FIGS. 8a, 8b and 15). The parts of rod 52 that extend outwardly from mounting plates 13 are disposed in U-shaped recesses 55 in guide and operating members 30. Similar U-shaped recesses 56 are disposed in the bottoms of members 30 in alignment with recesses 55 and each of pins 15 is disposed in their respective recess 56. L-shaped openings 57 are disposed in members 30 and these are defined as cam surfaces to move carriage 27 toward and away from mounting base 11 and plate 17 with rod 52, recesses 55, pins 15 and recesses 56 defining the guide means to assure parallel movement of carriage 27 relative to base 11 and plate 17.

Figures 10, 14:
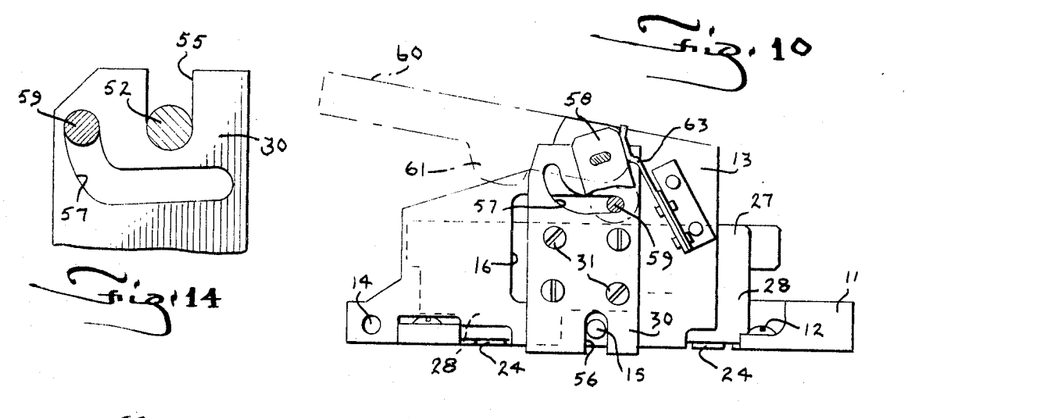
FIGS. 11 through 14 illustrate the various operating positions of the guiding and operating mechanism for the movable carriage.
Figure 11:
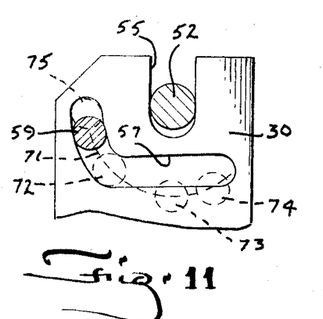

Actuating members 58 are keyed onto the ends of rod 52 (see FIGS. 9 and 10) so as to be movable therewith and each actuating member has a pawl member 59 extending outwardly therefrom which is cooperable with a corresponding opening 57. Upon movement of pawl members 59 in openings 57, members 30, carriage 27 and associated contact assembly 35 are movable in a parallel manner relative to base 11 and plate 17 which will be described in greater detail hereinafter. After cover member 4 has been placed in position on base 3, the ends of handle 60 are keyed onto the ends of rod 52 which extend outwardly through openings in the sides of the cover member so as to move actuating member 58 through their angular operating positions. Stop members 61 are located on handle 60 and these engage stepped surfaces 62 of cover member 4 so as to limit the downward movement of handle 60 thereby preventing pawl members 59 from exerting excessive force on members 30. A spring detent 63 (FIGS. 2, 9 and 10) is mounted on one of mounting members 13 and has its free end in engagement with an actuating member 58 so as to maintain the actuating members and associated pawl members in a normally and operative position as illustrated in FIGS. 9 and 11. The top edges of actuating members 58 are beveled so as to allow spring detent 63 to move easily therealong. Mounting plates 13, members 30 and actuating members 58 are duplicates of each other and therefore are interchangeable with each other.

A switch 64 (FIGS. 2 and 15) of the Micro-switch variety is mounted on base 11 and has an arm 65 extending outwardly therefrom which is normally disposed in the card-receiving area of the card reader so that when a card is disposed in the card-receiving area, the leading edge of the card engages arm 65 thereby moving it in a direction to actuate switch 64. The card-receiving area of the card reader is defined by recessed area 7, the inner surfaces of legs 28, stepped sections 66 of carriage 27, ejection spring 50, index plate 47 and the area between contact assembly 35 and insulating plate 17. Another switch 67 (FIG. 2) similar to that of switch 64 is mounted on bottom 5 and it has an arm with a roller thereon for engagement with actuating member 58 so that when the actuating member is moved to a card-reading position, the actuating member engages the arm of switch 67 thereby actuating same. Switches 64 and 67 are connected in series relationship so that both of these switches have to be actuated before any information is read out by the card reader. In other words, a card has to be disposed in the card receiving area actuating switch 64 before any information is transmitted from the card reader.

In order to assure that coded perforations 2 in card 1 are disposed in the card receiving area so that this code can be read by stationary contact members 18 and movable contact members 44, corners 68 (FIG. 15) on card 1 is beveled and this beveled corner engages a pin 69 in mounting base 11 of the inner card-receiving area as illustrated in FIG. 2. If the card is not properly placed in the card-receiving area so that corner 68 engages pin 69, then the card cannot be properly placed in the card-receiving area since it cannot be placed all the way therein.

Operation of the card reader is according to the following:

Rail members or stationary contacts 18 and contact members or movable contacts 37 are connected to appropriate equipment via conductive leads in accordance with a predetermined wiring pattern (not shown) and handle 60 is disposed in a normally inoperative position as illustrated in FIGS. 8a, 9 and 11 so that pawl members 59 are disposed above midway of the short legs of L-shaped openings 57 in guide and operating members 30. Card 1 is properly inserted within the card-receiving area of the card reader through entrance E until the outer edge of the card is disposed in recessed area 7 and the inner edge of the card is engaged against ejection spring 50 moving the free end of this spring into opening 51 of index plate 47 and beveled corner 68 is disposed adjacent pin 69. Spring 50 biases the outer end of the card against the surface of recessed area 7 while drag spring 46 engages the upper surface of the card and biases it in a direction toward plate 17 and contacts 18. The inner end of the card also engages arm 65 of switch 64 causing the switch to be actuated. The position of the card in the card-receiving area of the card reader is illustrated in FIGS. 4 and 8b.

Figure 12:
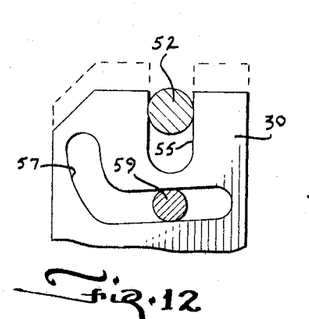
Figure 13:
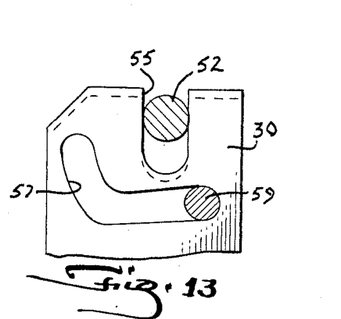

Coded openings 2 of the card are in position between stationary contacts 18 and movable contacts 37. With the card in the read out position, handle 60 is moved in a direction toward the front of the card reader with rod 52 and actuating members 58 thereon being rotated in a corresponding manner thereby causing pawl members 59 to move in openings 57 to a position illustrated in FIG. 12 which represents the fully depressed position of carriage 27 and the fully deflected position of contact feet 44 of contact members 37 which is illustrated by broken line 70 in FIG. 6, i.e. all of the movable contact members are deflected in a forward direction regardless of whether or not they are engaging the upper surface of card 1 or are in engagement with respective stationary contact members through coded openings 2. Handle 60 is moved until stop members 61 thereon engage stepped surfaces 62 of cover member 4 whereupon pawl members 59 are located against the ends of the long legs of L-shaped openings 57 as illustrated in FIG. 13. The contact feet of the movable contact members are located in the position illustrated in FIG. 8b with the contact feet resting on the upper surface of card 1 where no coded openings are located, and the contact feet engage the tops of respective contact members 18 where coded openings 2 are located. During the movement of actuating members 58, pawl members 59 trace an arcuate path 71 as illustrated in FIG. 11.

The movement of pawl members 59 from their normally inoperative position to a position illustrated by broken circle 72 causes no movement of carriage 27 and its associated contact assembly. With pawl members 59 moving from position 72 to position 73, which is similar to that illustrated in FIG. 12 and with no card in position in the card-receiving area, contact feet 44 engage the top surfaces of stationary contact members 18 and then move wipingly forward to the position illustrated at 70 in FIG. 6. The movement of pawl members 59 from position 73 to position 74, which is similar to that illustrated in FIG. 13, causes the contact feet to move in a back-wiping direction until they come to rest on top of stationary contact members 18 as illustrated in solid lines of FIG. 6. As pawl members 59 are moved back to their normally inoperative position from position 74 through positions 73 and 72 along arc 71, contact feet 44 move wipingly forwardly and backwardly once again. Thus, as pawl members 59 move along arc 71 in one direction and back again to complete a reading cycle of the card reader, contact feet 44 wipingly engage stationary contact members 18 twice in a forward direction and twice in a backward direction. The double wiping action of contact feet 44 on stationary contact members 18 provides an excellent mechanical and electrical connection between the movable contact members and the stationary contact members because the wiping action cleans the contact surfaces between the contact members during their interengagement under the influence of pressure.

It is also important to note that at each position of the movable contact members they are duplicated so that, not one, but two contact feet are available to electrically engage respective rail members 18 which increases the reliability of the present invention. As the contact feet are operated, whether engaging stationary contact members 18 through coded openings 2 or engaging the upper surface of card 1 where no coded openings occur, they are always guided in the spaces between insulating block 36 which assures the correct operation of these contact feet.

After the coded information on the card has been read out therefrom, the card is now ready to be ejected from the card-receiving area of the card reader. Handle 60 is moved in a reverse direction from its normally inoperative position and this causes actuating members 58 to be moved therealong as well as pawl members 59 until they reach the position illustrated at 75 in FIG. 11 which is similar to that of FIG. 14. As pawl members 59 engage the ends of the small legs of L-shaped openings 57 as handle 60 is moved in a reverse direction, carriage 27 through members 30 is moved in a direction away from the stationary contacts causing lugs 33 to engage the bottom surface of card 1 and move the card along with the outward movement of the carriage. As soon as the front edge of the card has moved free of recessed area 7, ejection spring 50 moves the card in an outward direction through entrance E. Since ejection spring 50 in ejecting a card from the card-receiving would propel the card completely free of the card reader, drag spring 46 applies a downward force on the upper surface of the card and prevents the card from being completely ejected from the card reader and allows enough of the card to project outwardly from the entrance so that an operator can readily grasp the card and remove it from the card reader.

Rail members 18 can be disposed almost completely across plates 17 in accordance with corresponding numbers of contact members 37. Rail members 18 can be individual contacts opposite corresponding individual contact feet 44 to provide a digital or other isolated read-out. Information on cards to be disposed in the card receiving area of the card reader can take various forms such as, for example, bumps, conductive strips, magnetic bits, etc.; but, for the purposes of the present invention, the preferable form is that of apertures disposed in the card in accordance with a code. Also, one end of a conventional data-processing card may be inserted within the card-receiving area in order to read part of the information thereon.

As can be discerned, there has been disclosed a unique card reader having a card receiving area with stationary and movable contact members therein, the movable contact members are carried by a movable carriage, an operating mechanism is operatively connected to the movable carriage to move the movable contact members into wiping engagement with the stationary contact members causing the movable contact members to reciprocably wipe the stationary contact members under the influence of pressure, and ejection means associated with the operating mechanism to readily eject a card from the card receiving area after the coded information thereon has been read out therefrom.

It should be understood that the movable contact assembly and the stationary contact assembly in conjunction with the operating means therefor may be used as a switching means per se in various environments such as, for example, programmable switching means.

What is claimed is:

1. An electrical contact assembly for a card reader and the like comprising a first carrier member having contact surface means disposed thereon, a second carrier member relatively movable toward and away from said first carrier member, and at least one spring connector means carried by said second carrier member, said spring connector means including a head portion and a plurality of leg and tip portions integral with the head portion, the head portion being fixed to said second carrier member, each leg portion including a thin, narrow, springy beam-like arm integral with the head portion and extending downward and outward at an acute angle therefrom, each tip portion including an extended rounded contact heel on the outer end of said arm, said tip portions providing dual contacts which wipe against and establish electrical connection to the contact surface means on said first carrier when said carrier members are moved relatively toward each other, said head, leg and tip portions lying substantially in the same plane and being formed from a thin, flat piece of metal, the thickness of each arm being the thickness of said piece of metal, the width of each arm being sufficient to give desired spring pressure of said tip portions against their respective opposite contact surface means, said tip portions having an extended area lying in said plane, the edge of said tip heel being arcuate to provide a smooth contacting area against said contact surface means.

2. An electrical contact assembly according to claim 1 wherein said spring connector means are duplicated so that there are duplicate head portions, leg portions and tip portions separated by metallic plate means.

3. An electrical contact assembly according to claim 1 wherein said second carrier member comprises insulating blocks between which said spring connector means are disposed with said leg portions and part of said tip portions being freely movable between said insulating blocks thereby being guided by said insulating blocks.

4. An electrical contact assembly according to claim 3 wherein surfaces of said insulating blocks from which said tip portions extend define means to prevent overstressing of said leg portions when said tip portions are moved within the confines of said insulating blocks.

5. An electrical contact assembly according to claim 1 wherein said contact heels, when electrically engaging said contact surface means, give double wiping on said contact surface means as said first carrier member is being moved toward and away from said second carrier member.

6. An electrical contact assembly comprising a first carrier member having contact surface means disposed thereon, a second carrier member relatively movable toward and away from said first carrier member, means maintaining said second carrier member in a position normally away from or in engagement with said first carrier member, dielectric means provided by said second carrier member and having surface means facing said first carrier member and slot means provided in said dielectric means, spring connector means disposed in said slot means, said spring connector means being formed from a thin and flat piece of metal and including a plate section and a plurality of stiffly-flexible leg members extending outwardly from said plate section at an acute angle with respect to an inner edge thereof and along said slot means, contact foot means at outer ends of said stiffly-flexible leg members which normally extend outwardly beyond said surface means, for electrical engagement with said contact surface means, said plate section, leg members and contact foot means lying in the same plane and the thickness of eace leg member being the thickness of said piece of metal, the width of each leg member being sufficient to give desired spring pressure of said contact foot means against its respective opposite contact surface means, and edges of said contact foot means being arcuate to provide a smooth contacting surface against said contact surface means.

7. An electrical contact assembly according to claim 6 wherein said leg members extend outwardly from said inner edge at about 35° therefrom.

8. An electrical contact assembly according to claim 6 wherein said spring connector means are duplicated thereby providing duplicate plate sections, leg members and contact foot means.

9. An electrical contact assembly according to claim 8 wherein plate means are disposed between said plate sections.

10. In a card reader, a mounting base, stationary contact means disposed on said base, movable contact means disposed along said stationary contact means, means in engagement with said movable contact means and maintaining said movable contact means normally spaced from said stationary contact means, contact elements disposed along said stationary contact means, contact members and insulating blocks provided by said movable contact means, said contact members defining plate means having leg members disposed between said insulating blocks with said leg members extending toward respective contact elements at an acute angle with respect thereto, contact-engaging members at free ends of said leg members which extend outwardly from surfaces of said insulating blocks and in alignment with respective contact elements, said contact members being formed from a thin, flat piece of metal, said contact-engaging members and said leg members being in the same plane as said plate means, said contact-engaging members having an extended area lying in said plane and presenting arcuate-shaped edges for wiping engagement with said contact elements, said insulating blocks defining guide means to guide reciprocatory movement of said leg members therebetween when said contact-engaging members electrically engage said contact elements and operating means connected to said movable contact means for moving said movable contact means toward said stationary contact means so that said operating means and said maintaining means cause said contact-engaging members to wipingly engage said contact elements.

11. In a card reader, a mounting base, stationary contact means mounted on said base, movable contact means disposed along said stationary contact means and being normally spaced from said stationary contact means, said stationary contact means defining a card-receiving area onto which a data card is to be placed, said stationary contact means having an entrance provided with abutment means against which an end of the data card abuts when it is placed in said card-receiving area via said entrance, spring means adjacent an inner end of said stationary contact means for biasing the end of the data card against said abutment means, operating means connected to said movable contact means for moving said movable contact means toward and away from said stationary contact means, release means provided by said movable contact means and said operating means for releasing the end of the data card from said abutment means so that said spring means ejects the data card partially out of said card-receiving area, and drag spring means extending along said card-receiving area for engagement with the data card to prevent the data card from being completely ejected from said card-receiving area via said first-mentioned spring means.

References Cited
UNITED STATES PATENTS

| | | |
|---|---|---|
| 3,132,241 | 5/1964 | Wolfheimer. |
| 3,139,519 | 6/1964 | Reinschmidt. |
| 3,200,240 | 8/1965 | Hammel. |
| 3,267,260 | 8/1966 | Baker. |
| 2,372,882 | 4/1945 | Daly et al. |
| 3,158,419 | 11/1964 | Meyer et al. |
| 3,352,981 | 11/1967 | Ekers ____________ 235—61.11 |

OTHER REFERENCES

Robitschek: "Brush Punched Card Sensing Device," March, 1962, RCA Technical Notes, No. 504.

DARYL W. COOK, Primary Examiner

T. J. SLOYAN, Assistant Examiner

U.S. Cl. X.R.

200—46; 340—339